United States Patent
Haller et al.

(10) Patent No.: US 8,200,844 B2
(45) Date of Patent: Jun. 12, 2012

(54) USING A RESOURCE CONTEXT TO ACCESS RESOURCES AND SOURCE DATA FOR A TRANSFORM

(75) Inventors: Michael Haller, Niwot, CO (US); Harry Reese Lewis, Jr., Longmont, CO (US); James T. Smith, Boulder, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 1258 days.

(21) Appl. No.: 11/379,035

(22) Filed: Apr. 17, 2006

(65) Prior Publication Data
US 2007/0242302 A1     Oct. 18, 2007

(51) Int. Cl.
*G06F 15/16*     (2006.01)
(52) U.S. Cl. ........................................ 709/246; 719/330
(58) Field of Classification Search .................. 709/246; 719/330
See application file for complete search history.

(56) References Cited

U.S. PATENT DOCUMENTS

| | | | | |
|---|---|---|---|---|
| 7,287,094 B2 * | 10/2007 | Mogul | ........................... | 709/246 |
| 7,325,027 B2 * | 1/2008 | Grow et al. | .................... | 709/201 |
| 2002/0059566 A1 | 5/2002 | Delcambre et al. | | |
| 2002/0099852 A1 | 7/2002 | Fischer | | |
| 2002/0198902 A1 | 12/2002 | Sankaran et al. | | |
| 2003/0120730 A1 | 6/2003 | Kuno et al. | | |
| 2004/0068586 A1 * | 4/2004 | Xie et al. | ....................... | 709/246 |
| 2004/0086586 A1 | 5/2004 | Lahmann et al. | | |
| 2004/0111533 A1 * | 6/2004 | Beisiegel et al. | ............. | 709/246 |
| 2004/0120011 A1 * | 6/2004 | Double | ........................ | 358/1.18 |
| 2004/0130751 A1 * | 7/2004 | Hirtenreiter et al. | ......... | 358/1.18 |
| 2004/0221063 A1 * | 11/2004 | Mogul | ........................... | 709/246 |
| 2005/0147130 A1 * | 7/2005 | Hurwitz et al. | ............... | 370/503 |
| 2006/0179406 A1 * | 8/2006 | Tolpin | ........................... | 715/520 |
| 2007/0174488 A1 * | 7/2007 | Kamyshenko et al. | ....... | 709/246 |
| 2007/0239726 A1 * | 10/2007 | Weiss et al. | ..................... | 707/10 |

FOREIGN PATENT DOCUMENTS

JP     4040000546 A     1/1992

* cited by examiner

*Primary Examiner* — Duyen Doan
(74) *Attorney, Agent, or Firm* — Blakely, Sokoloff, Taylor & Zafman LLP (57) ABSTRACT

Provided are a method, system, and article of manufacture for using a resource context to access resources and source data for a transform. A transform receives a request to transform source data and calls a resource context. The resource context initializes a resource object for the transform and acquires associations to source data and resources needed by the transform. The resource context maintains the acquired associations to source data and resources in the resource object for the transform and supplies the associations to the source data and resources to the transform. The transform transforms the source data using the resources to produce output and provides the output to the resource context.

19 Claims, 5 Drawing Sheets

USING A RESOURCE CONTEXT TO ACCESS RESOURCES AND SOURCE DATA FOR A TRANSFORM

BACKGROUND OF THE INVENTION

1. Field of the Invention

The present invention relates to a method, system, and program for using a resource context to access resources and source data for a transform.

2. Description of the Related Art

A transform service in a transform factory is invoked by an application to perform a transformation on data before the data is transmitted to a client system. The transform may access source data to transform and resources, such as fonts and stylesheets, to format the source data as part of the transform operation. For instance, a transform may transform data from one presentation format, e.g., PostScript, to another, e.g., Printer Command Language (PCL). The transform service may further transform data for a specific output device, e.g., specific type of printer, display device, etc. The transforms may have to acquire and maintain all the resources and source data to use to perform the transform and transmit transformed data to the clients. In the event of a failure or disruption in the transmission to the clients, the transforms have to recover from the failure and reacquire source data and resources.

There is a need in the art for improved techniques for implementing transform operations.

SUMMARY

Provided are a method, system, and article of manufacture for using a resource context to access resources and source data for a transform. A transform receives a request to transform source data and calls a resource context. The resource context initializes a resource object for the transform and acquires associations to source data and resources needed by the transform. The resource context maintains the acquired associations to source data and resources in the resource object for the transform and supplies the associations to the source data and resources to the transform. The transform transforms the source data using the resources to produce output and provides the output to the resource context.

DETAILED DESCRIPTION

Figure 1:
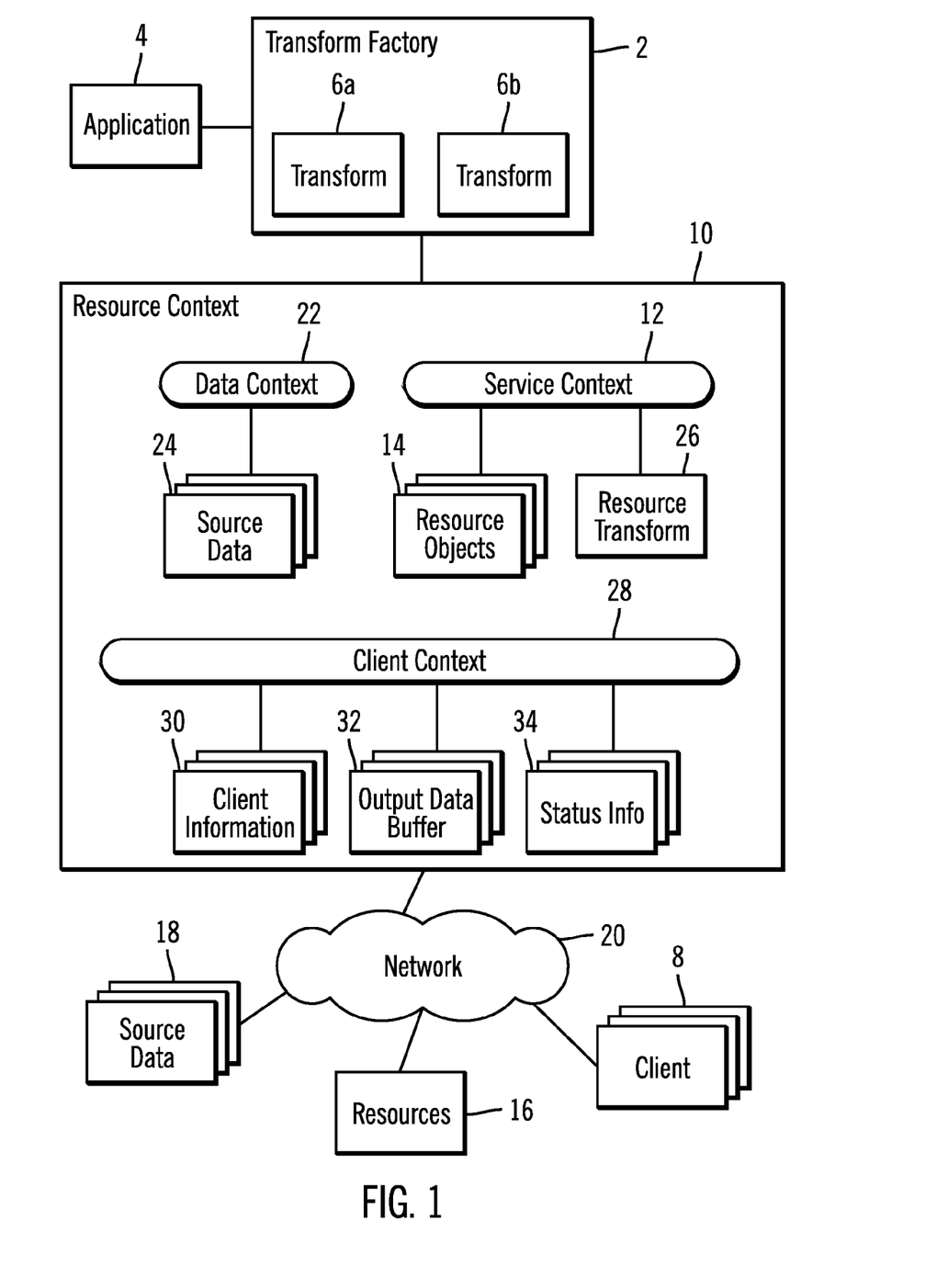
FIG. 1 illustrates an embodiment of a computing environment.

FIG. 1 illustrates a computing environment in which embodiments are implemented. A transform factory 2 provides applications 4 one or more transforms 6a, 6b that provides transform services to transform data from the application 4 and transmit to one or more clients 8. A transform 6a, 6b may transform the format of the data from the application 4 for presentation or consumption. For instance, the transform 6a, 6b may apply stylesheets or other formatting properties to the data, e.g., fonts, templates, Extended Markup Language Stylesheet (XSL). Further, the client 8 receiving the transformed data may consume the data, e.g., using or saving, instead of presenting the data. Additionally, the transforms 6a, 6b may transform data from one presentation or consumption format, e.g., PostScript, to another, such as PCL. The transforms 6a, 6b utilize interfaces of a resource context 8 to obtain the source data and resources needed for the transform operation and to transmit the transformed data, or output, to the clients 8.

The resource context 10 includes a service context 12 that includes classes and methods to handle the request from the transforms 6a, 6b and initialize a resource object 14 for an instance of a transform 6a, 6b. The resource object 14 maintains availability of source data and resources needed by the transform 6a, 6b. For instance, the resource object 14 may maintain the actual source data and resources needed by the transform 6a, 6b or maintain references to the source data and resources that the transform 6a, 6b may use to access. The service context 12 may initialize one or more resource objects 14 for each instantiated instance of a transform 6a, 6b performing a particular transform. The transform 6a, 6b may require resources 16, such as fonts, stylesheets, templates, functions or other information or code used in the course of transforming source data 18 from the application 4 from one format to another. The call from the transform 6a, 6b to the service context 12 may identify the source data 18 and resources 16 to obtain and the type of transform. The service context 12 may then call specific methods for the type of transform requested to acquire the appropriate resources 16 (or references thereto), which may require the service context 12 to access resources 16 from a remote location over a network 20 using suitable remote access procedures known in the art, e.g., remote procedure calls, web services. Additionally, the service context 12 may maintain reference information that the transform 6a, 6b may use to access the resources 16 from the remote location.

The service context 12 may further call a data context 22 which includes classes and methods to access the source data 18 or provide a reference to the source data 18. The data context 18 may maintain the accessed source data 18 as source data 24 in a local storage that it may provide to the transform 6a, 6b. Further, the data context 18 may serve as a conduit or a referential source, such that the data context 18 maintains a reference to the source data without storing the source 18 locally. The source data 24 may be maintained separately or with the resource objects 14 to make available to the transforms 6a, 6b. The service context 12 may additionally call a resource transform 26 which performs a transformation on an accessed resource 16 to maintain in the resource object 14 for a transform 6a, 6b. Additionally, the resource transform 26 may generate the resource that the transform 6a, 6b requires. For instance, if the resource comprises a font or stylesheet, then the resource transform 26 may generate that resource without having to access the resource 16 remotely over the network 20.

The resource context 10 further includes a client context 28 comprising classes and methods that the transform 6a, 6b invokes to transmit output generated from the transform 6a, 6b to one or more of the clients 8. The clients 8 may comprise printers, display devices, computers, applications, etc. The client context 28 maintains client information 30 for each client to which the output may be transmitted. The client information 28 may specify a presentation or consumption format for the output so that the output may be transformed to conform with the output capabilities of the target client 8. Alternatively, all such data format transformations may be performed by the transforms 6a, 6b and not the client context 28. The client information 30 may additionally specify a communication method for transmitting the output over the network 20 to the client. The communication method may indicate a transmission protocol and transmission technique, e.g., streaming settings, transmission speed, packet size, packet buffer settings, etc. In one embodiment, the transforms 6a, 6b may transform the format of the data for the client 8. Alternatively, the client context 28 may use client information 30 for a particular client to transform the format the output of the data. For instance, if the client 8 comprises a small hand held computer device, such as a personal digital assistant, accessible over a wireless network, then the output may be transformed into an output format compatible with a small hand held computer screen. Alternatively, if the client 8 comprises a more powerful computer with substantial graphics capabilities, then the output may be transformed into an output suitable for a computer having significant graphics capabilities. The client context 28 may further use communication methods in the client information 30 to format the output for transmission over a particular type of network used by the client 8, e.g., wireless, high speed network, etc. The client context 28 may maintain a separate buffer 32 to store and buffer transformed output data to transmit or stream to the target client 8 over the network 20. One buffer 32 may be maintained for each transform 6a, 6b instance utilizing the resource context 10 services.

Additionally, the client context 28 may maintain methods and interfaces for the clients 8 to allow the clients 8 to communicate information to the transform, such as acknowledgment that output is received, requests for further output, etc.

The network 20 may comprise a suitable network, such as a Local Area Network (LAN), Storage Area Network (SAN), Wide Area Network (WAN), wireless network, peer-to-peer network, the Internet, an Intranet, etc. The application 4, transform factory 2, and resource context 10 components may be implemented in one or more computer systems that connect and communicate over a network. The transforms 6a, 6b may invoke the resource context 10 services as local or remote services. The clients 8 may comprise workstations, desktop computers, mainframes, hand held computing devices, telephony devices, printers, other output devices, applications, web services, etc.

Figure 2:
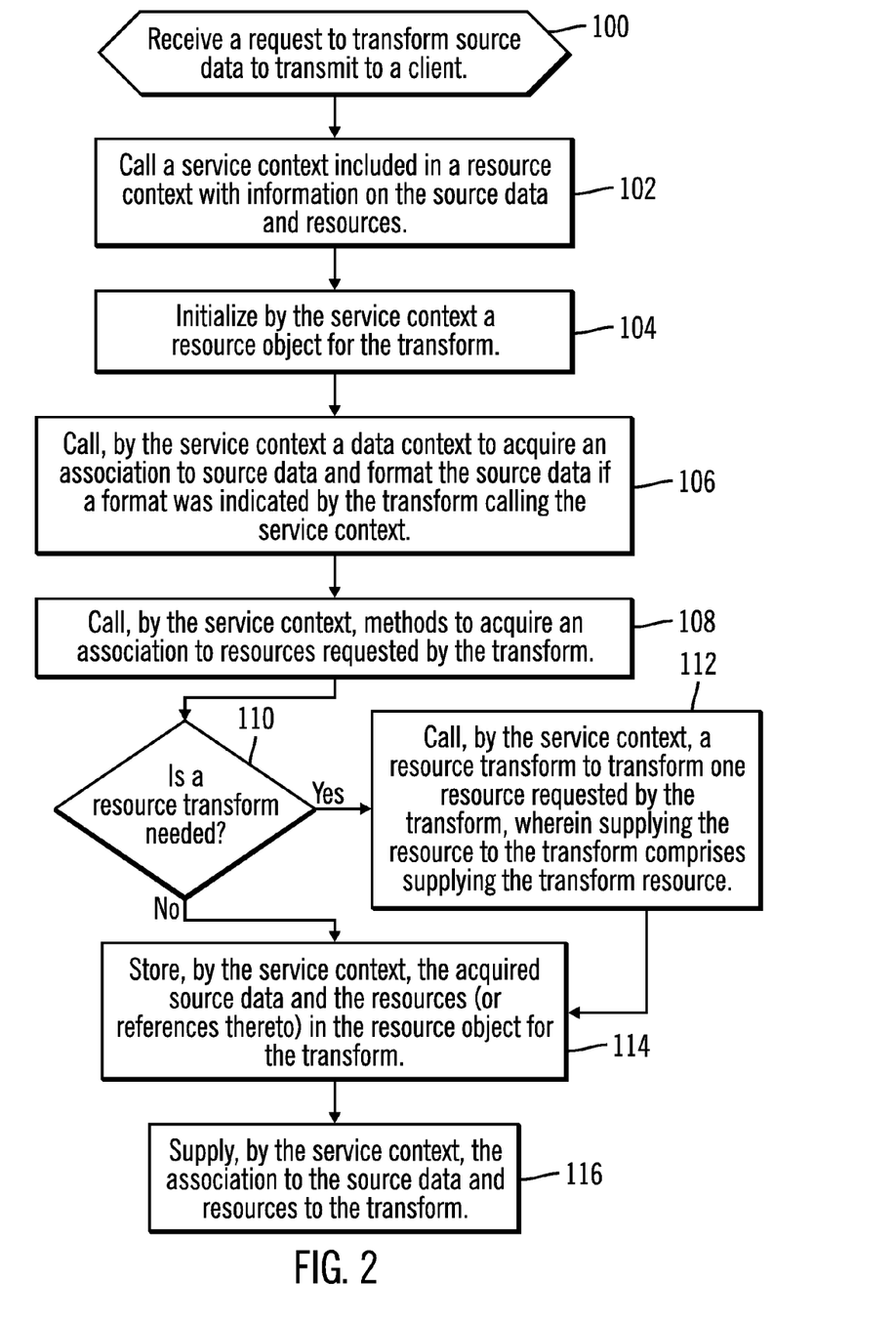
FIG. 2 illustrates an embodiment of operations performed to have a resource context provide resources and source data to a transform.

FIG. 2 illustrates an embodiment of operations performed by the transforms 6a, 6b and resource context 10 components to provide the transform 6a, 6b with requested source data 18 and resources 16 needed to perform the transform. In response to the transform 6a, 6b receiving (at block 100) a request to transform source data 18 to transmit to a target client 8, the transform 6a, 6b calls (at block 102) a service context 12 included in the resource context 10 with information on the source data 18 and required resources 16. In response, the service context 12 initializes (at block 104) a resource object 14 for the requesting transform 6a, 6b, if one is not already initialized. The service context 12 then calls (at block 106) data context 18 services to acquire an association to the requested source data 18. The acquired association may comprise acquiring the actual data to store locally as source data 24 or acquiring a reference to the source data 18 the transform 6a, 6b may use to directly access the data. The service context calls (at block 108) methods to acquire an association to resources 16 requested by the transform 6a, 6b. The acquired source data 18 and resources 16 may be acquired from remote locations over the network 20 or may be acquired from a local storage to the system in which the resource context 10 is executed. Acquiring an association to resources 16 may comprise acquiring the actual resource 16 or a reference to the resource to provide to the transform 6a, 6b.

The service context 12 further determines (at block 110) whether a resource transform 26 is required. A resource transform 26 may be required to perform a transform on a resource 16 accessed from over the network 20 or to generate the requested resource without going remote access over the network 20. If the resource transform is required, then the service context 12 calls (at block 112) one or more resource transforms 24 to transform one resource requested by the transform. After initiating a resource transform 26 (at block 112) or if a resource transform 26 is not required (from the no branch of block 110), then the service context 12 stores (at block 114) the acquired association to the source data and the resources in the resource object 14 for the requesting transform 6a, 6b to use. As discussed, the acquired association may comprise the actual requested source data and resources or references thereto. The service context 12 then supplies the association to the requested source data 24 and/or resources (i.e., actual data or resources or references thereto) to the transform 6a, 6b. The transform 6a, 6b may subsequently request source data 24 and resources (or references) as needed for further transform operations to generate and stream data to the target client 8.

Figure 3:
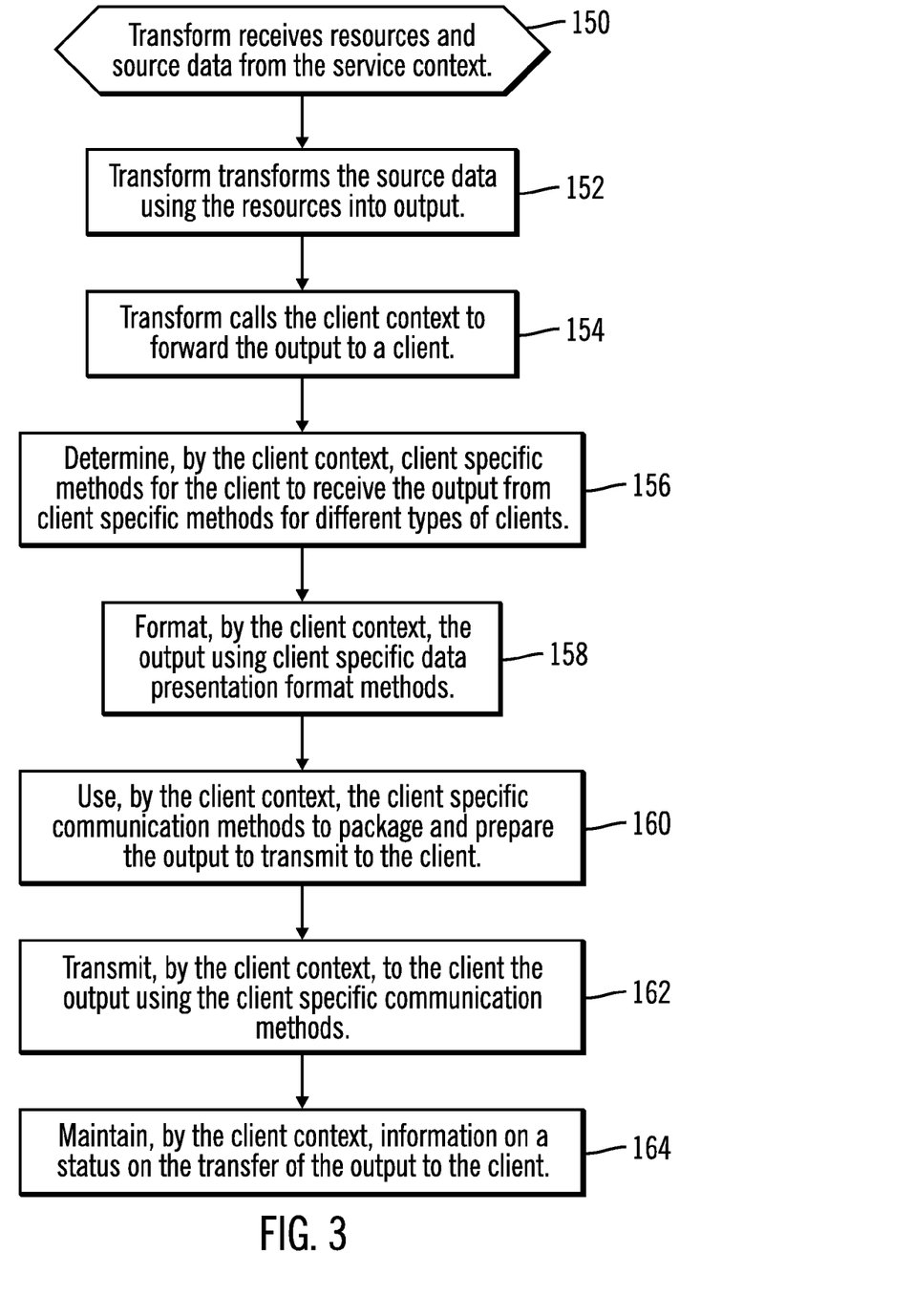
FIG. 3 illustrates an embodiment of operations performed to have a resource context transmit transformed output to a client.

FIG. 3 illustrates an embodiment of operations to communicate transformed data from the transform 6a, 6b to one or more target clients 8. Upon the transform receiving (at block 150) the requested resources 16 and source data 24 from the service context 12 (or references thereto to use to access the source data 18 or resources 16), the transform 6a, 6b transforms (at block 152) the received source data using the received resources into transformed output. The transform 6a, 6b calls (at block 154) the client context 28 to forward the transformed output to a target client 8.

In response to the call, the client context determines (at block 156) client specific information 28 for the target client 8. The client specific information 28 may include methods for presentation, consumption and communication for the client 8. The client context 28 may format (at block 158) the output using client specific data presentation format methods for a presentation compatible with the presentation capabilities of the target client 8. As discussed, in additional embodiments, all data formatting transforms may be performed by the transforms 6a, 6b, and not the client context 28. The client context 28 further uses (at block 160) the client specific communication methods to package and prepare the output to transmit to the target client 8. The client context 28 transmits (at block 162) the output to the client using the client specific communication methods. The client context 28 may stream output to the client 8 by buffering formatted output in the output data buffer 32. The client context 12 may further maintain (at block 164) status information 34 for each transform 6a, 6b currently using the resource context 10 on a status of the transfer of the output to the client, e.g., the last transmitted packet of output. The client context 28 may retain transmitted output in the buffer 32 until successful transmission for the packet is confirmed by the client 8. The client 8 may use interfaces of the client context 28 to communicate status information on the transmission for use by the client context 28 that is handling the transmission, e.g., streaming, or for use by the transform 6a, 6b.

Figure 4:
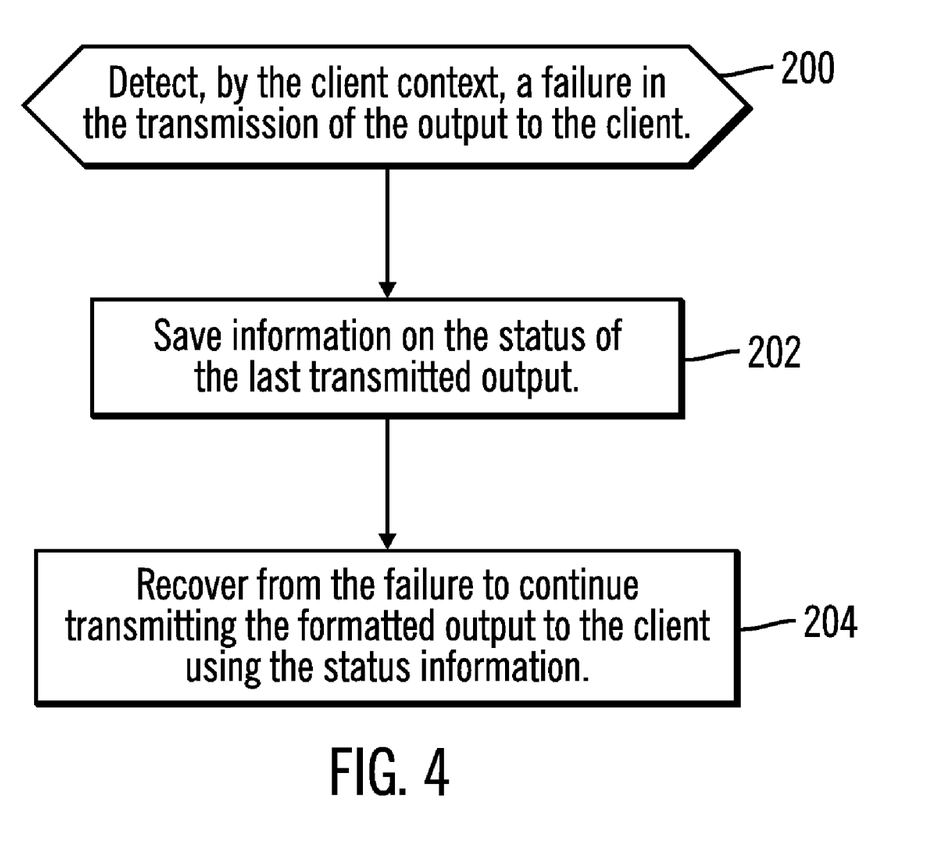
FIG. 4 illustrates an embodiment of operations performed to recover from a failure of the transmission to the client.

FIG. 4 illustrates an embodiment of operations performed by the client context 28 to handle a failure in the processing of data and resources or transmission to the client 8. In response to detecting (at block 200) a failure in the transmission of the output to the client 8, the client context 28 saves (at block 202) information on the status 32 of the last transmitted output. The client context 28 recovers (at block 204) from the failure to continue transmitting the formatted output to the client using the status information 34 to determine the point from which to continue transmitting after recovery from a failure.

Described embodiments provide a resource context that is used to provide resources and source data to a transform so that the transform does not have to acquire and maintain resources and source data itself. The transform uses an interface to the resource context to acquire the necessary data and resources (or references to the data and resources) and transmit transformed output without having to perform the specific operations to acquire and maintain resources and source data and maintain a connection to the client to transmit output. Providing a resource context to handle certain operations reduces the complexity of the operations that the transform has to perform to acquire resources and source data and transmit transformed data.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 5:
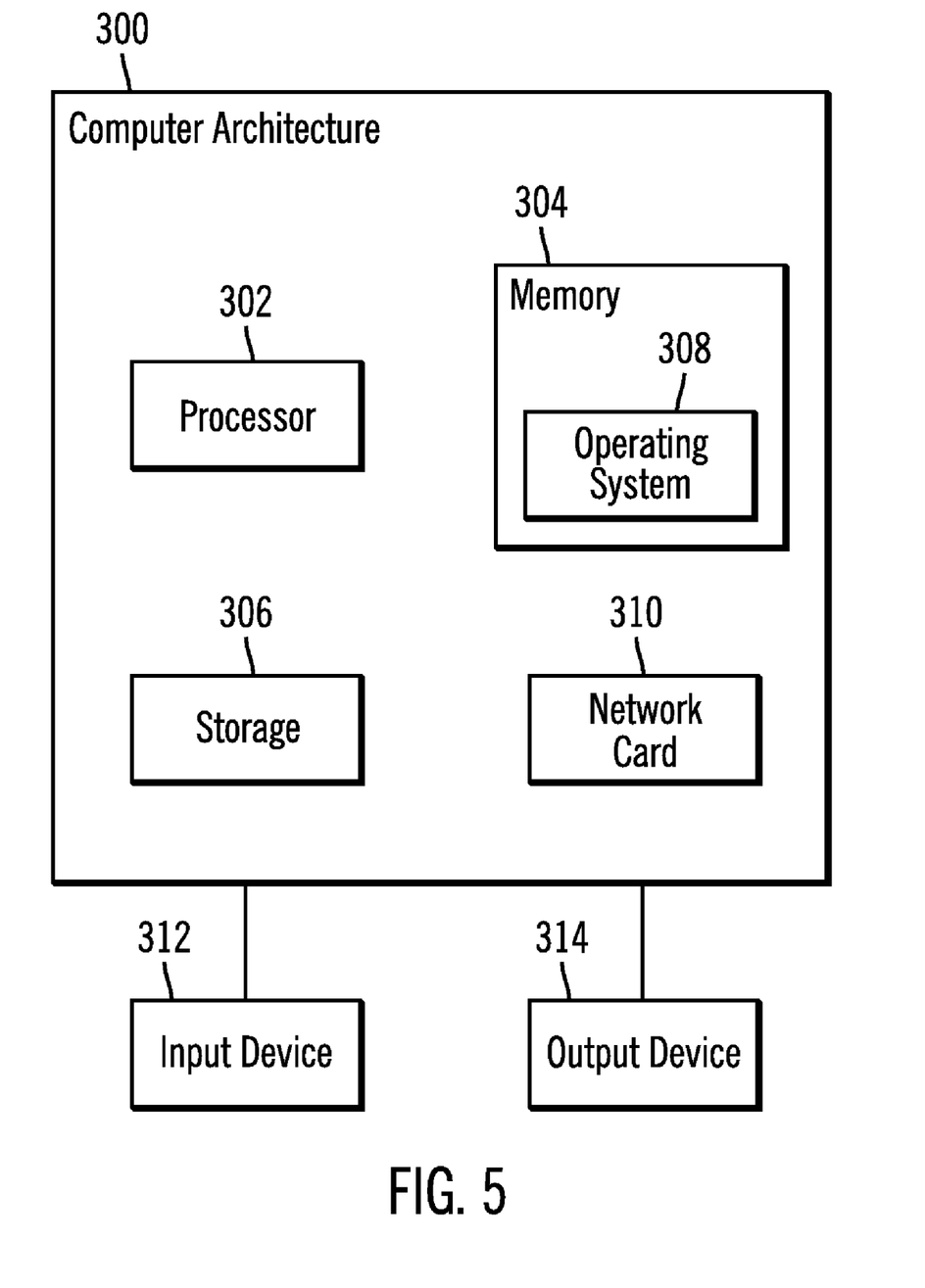
FIG. 5 illustrates an embodiment of a computer architecture.

FIG. 5 illustrates an embodiment of a computer architecture 300 that may be implemented by one or more systems in which the application 4, transform factory 2 and resource context 10 components are implemented. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308 and application programs, in the storage 306 are loaded into the memory 304 and executed by the processor 302 in a manner known in the art. The architecture further includes a network card 310 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

Although FIG. 1 illustrates a certain number of components, such as the transforms, application source data, resource objects, etc, there may be any number of these elements in different systems.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices, components, applications and services that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device, component or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2, 3, and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving, by a transform, a request to transform source data;
   calling, by the transform, a resource context;
   initializing, by the resource context, a resource object for the transform;
   acquiring, by the resource context, from a remote location associations to source data and resources used by the transform to transform the source data;
   maintaining, by the resource context, the acquired associations to source data and resources in the resource object for the transform;
   supplying, by the resource context, the associations to the source data and resources to the transform;
   transforming, by the transform, the source data using the resources and information received from a client to produce transformed output; and
   maintaining, by a client context, status information on providing the output to the client;
   detecting a failure occurring in the transmission of the output to the client; and
   recovering from the failure using the status information to continue providing the output to the client from the last transmitted output prior to the failure.

2. The method of claim 1, wherein the resources used by the transform to transform the source data comprises fonts, stylesheets and templates.

3. The method of claim 1, wherein providing, by the transform, the output to the resource context comprises:
   providing the output to the client context to forward the output to a target client; and
   determining, by the client context, client specific methods to use to transmit the output to the target client, wherein the client context maintains client specific methods for different clients.

4. The method of claim 3, wherein different clients have different types of communication requirements, wherein the client specific methods for the target client transmit the data to the target client using the client specific communication methods, further comprising:
   formatting the data using client specific information.

5. The method of claim 4, wherein the client to which the transformed output is transmitted comprises a printer.

6. The method of claim 1, wherein the source data is received in a first page description language and transformed by the transform into a second page description language.

7. The method of claim 6, wherein the first page description language is a PostScript format and the second page description language is a Printer Command Language (PCL) format.

8. A system, comprising:
   a processor to execute:
      a transform for receiving a request to transform source data and calling a resource context;
      a resource context enabled to perform operations, comprising:
         initializing a resource object for the transform;
         acquiring from a remote location associations to source data and resources used by the transform to transform the source data;
         maintaining the acquired associations to source data and resources in the resource object for the transform; and
         supplying the associations to the source data and resources to the transform, wherein the transform further transforms the source data using the resources and information received from a client to produce transformed output; and provide the output to the resource context; and
      a client context enabled to perform operations, comprising:
         maintaining status information on providing the output to a client;
         detecting a failure occurring in the transmission of the output to the client; and
         recovering from the failure using the status information to continue providing the output to the client from the last transmitted output prior to the failure.

9. The system of claim 8, wherein the resources used by the transform to transform the source data comprises fonts, stylesheets and templates.

10. The system of claim 8, further comprising:
    wherein the transform provides the output to the resource context by providing the output to the client context to forward the output to a target client, and wherein the client context further determines client specific methods to use to transmit the output to the target client, wherein the client context maintains client specific methods for different clients.

11. The system of claim 10, wherein different clients have different types of communication requirements, wherein the client specific methods for the target client transmit the data to the target client using the client specific communication methods, wherein the transform or the client context further perform formatting the data using client specific information.

12. The system of claim 8, further comprising:
    a resource transform, wherein the resource context further calls the resource transform to transform one resource requested by the transform, wherein supplying the resource to the transform comprises supplying the transformed resource.

13. An article of manufacture including a non-transitory machine readable medium having code to implement a transform and resource context, wherein the code is executed by a processor to cause the transform and resource context to perform operations, the operations comprising:
    receiving, by the transform, a request to transform source data;
    calling, by the transform, the resource context;

initializing, by the resource context, a resource object for the transform;

acquiring, by the resource context, from a remote location associations to source data and resources used by the transform to transform the source data;

maintaining, by the resource context, the acquired associations to source data and resources in the resource object for the transform;

supplying, by the resource context, the source data and resources to the transform;

transforming, by the transform, the source data using the resources and information received from a client to produce transformed output; and maintaining, by a client context, status information on providing the output to the client;

detecting a failure occurring in the transmission of the output to the client; and recovering from the failure using the status information to continue providing the output to the client from the last transmitted output prior to the failure.

14. The article of manufacture of claim 13, wherein the resources used by the transform to transform the source data comprises fonts, stylesheets and templates.

15. The article of manufacture of claim 13, wherein the code further implements the client context, wherein providing, by the transform, the output to the resource context comprises providing the output to the client context to forward the output to a target client, wherein the operations further comprise:

determining, by the client context, client specific methods to use to transmit the output to the target client, wherein the client context maintains client specific methods for different clients.

16. The article of manufacture of claim 15, wherein different clients have different types of communication requirements, wherein the client specific methods for the target client transmit the data to the target client using the client specific communication methods, and wherein the client context or the transform further perform formatting the data using client specific information.

17. The article of manufacture of claim 14, wherein the operations further comprise:

calling, by the resource context, a resource transform to transform one resource requested by the transform, wherein supplying the resource to the transform comprises supplying the transformed resource.

18. The method of 6, wherein the client is a printer that prints the output received in the second page description language.

19. The method of 1, wherein the source data is received in a page description language and transformed by the transform into presentation data to be displayed at a display device.

* * * * *